United States Patent
Hostetter et al.

(10) Patent No.: US 11,898,652 B2
(45) Date of Patent: Feb. 13, 2024

(54) FLOW CONTROL DEVICE AND TRIM CARTRIDGE ASSEMBLY FOR A FLOW CONTROL DEVICE

(71) Applicant: FISHER CONTROLS INTERNATIONAL LLC, Marshalltown, IA (US)

(72) Inventors: Steven K. Hostetter, Colfax, IA (US); Aaron Anderson, Marshalltown, IA (US); Lucas J. Schmitt, Conrad, IA (US)

(73) Assignee: FISHER CONTROLS INTERNATIONAL LLC, Marshalltown, IA (US)

( * ) Notice: Subject to any disclaimer, the term of this patent is extended or adjusted under 35 U.S.C. 154(b) by 425 days.

(21) Appl. No.: 17/223,067

(22) Filed: Apr. 6, 2021

(65) Prior Publication Data
US 2021/0388916 A1 Dec. 16, 2021

Related U.S. Application Data

(63) Continuation of application No. 16/901,898, filed on Jun. 15, 2020, now Pat. No. 11,339,891.

(51) Int. Cl.
*F16K 27/08* (2006.01)
*B33Y 80/00* (2015.01)

(52) U.S. Cl.
CPC ............... *F16K 27/08* (2013.01); *B33Y 80/00* (2014.12)

(58) Field of Classification Search
CPC ..... F16K 3/246; F16K 27/08; F16K 2200/502
See application file for complete search history.

(56) References Cited

U.S. PATENT DOCUMENTS

| | | | | |
|---|---|---|---|---|
| 3,834,666 A | * | 9/1974 | Keith | F16K 1/34 137/625.38 |
| 4,137,934 A | * | 2/1979 | Rice | F16K 27/02 251/282 |
| 6,932,321 B2 | * | 8/2005 | Baumann | F16K 27/04 277/530 |
| 8,714,560 B2 | ‡ | 5/2014 | Faas | F16J 15/3236 277/530 |
| 11,407,070 B2 | * | 8/2022 | Adams | F16K 1/36 |
| 2016/0076653 A1 | ‡ | 3/2016 | Bell | F16K 3/246 251/359 |
| 2018/0216745 A1 | * | 8/2018 | Gabriel | F16K 1/465 |
| 2020/0355289 A1 | ‡ | 11/2020 | Hostetter | F16K 27/041 |

* cited by examiner
‡ imported from a related application

*Primary Examiner* — Reinaldo Sanchez-Medina
(74) *Attorney, Agent, or Firm* — MARSHALL, GERSTEIN & BORUN LLP (57) ABSTRACT

A flow control device has a valve body having an inlet, an outlet, and a flow path connecting the inlet and the outlet and a unitary trim cartridge assembly secured to the valve body. The trim cartridge assembly has a cage disposed in the flow path, a bonnet coupled to the cage, and a retaining element disposed between the cage and the bonnet. The cage includes an exterior groove formed on an exterior surface of the cage, the bonnet includes an interior groove formed on an interior surface of the bonnet, and the retaining element extends into the interior groove and the exterior groove. A height of the interior groove and/or a height of the exterior groove is greater than a height of the retaining element to allow the cage to move longitudinally within the bonnet with the bonnet and cage assembled.

20 Claims, 9 Drawing Sheets

FLOW CONTROL DEVICE AND TRIM CARTRIDGE ASSEMBLY FOR A FLOW CONTROL DEVICE

CROSS-REFERENCE TO RELATED APPLICATIONS

This application is a continuation-in-part of U.S. patent application Ser. No. 16/901,898, entitled "Retaining Ring for a Flow Control Device" and filed on Jun. 15, 2020, the entire disclosure of which is hereby incorporated by reference herein.

FIELD OF THE DISCLOSURE

The present disclosure relates to a flow control device, and in particular, a trim cartridge assembly for a flow control device.

BACKGROUND

Control valves are commonly used in process plants to control the flow of a fluid (e.g., a gas, a liquid, etc.) or any other substance through pipes and/or vessels to which they are connected. A control valve is typically composed of one or more inlets and outlets, and includes a control element or member (e.g., a valve gate, a piston, a cage, a valve plug, a control member, etc.) that operates to control fluid flow through apertures that fluidly couple the inlet(s) to the outlet(s). A control member is typically coupled to a valve bonnet that is mechanically coupled (e.g., bolted, clamped, threaded into, etc.) to the valve body. Typically, the control member is configured to engage a sealing structure (e.g., a valve seat) that encompasses a flow path through the valve. A regulator is a self-controlling form of a control valve.

To couple a bonnet to valve body, the bonnet is clamped to the valve body using a plurality of fasteners. However, clamped control valve trim inherently has variability in the height difference between the seat ring gasket and bonnet gasket surfaces due to manufacturing tolerance as well as additional thermal expansion during use. This variability must be taken up somehow within the mating components. Typically, this is done with a stack of multiple components including a spiral wound gasket, which acts both as a gasket and a spring. The bonnet clamping holds down the spiral wound gasket, loading the cage which in turn loads the seat ring flat sheet gasket. In addition, this stack of individual components makes it only possible to evaluate the entire valve body unit's performance when it is assembled, rather than just the commonly replaced "trim" components.

BRIEF SUMMARY OF THE DISCLOSURE

In accordance with one exemplary aspect of the present invention, a flow control device comprises a valve body having an inlet, an outlet, and a flow path connecting the inlet and the outlet, and a unitary trim cartridge assembly secured to the valve body. The trim cartridge assembly comprises a cage, a bonnet coupled to the cage, and a retaining element disposed between the cage and the bonnet. The cage is disposed in the flow path and includes an exterior groove formed on an exterior surface of the cage. The bonnet includes an overlapping portion and an interior groove formed on an interior surface of the bonnet and on the overlapping portion. The retaining ring extends into the interior groove of the bonnet and the exterior groove of the cage. A height of the interior groove in the bonnet and/or a height of the exterior groove of the cage is greater than a height of the retaining element to allow the cage to move longitudinally within the bonnet with the bonnet and cage assembled.

In further accordance with any one or more of the foregoing exemplary aspects of the present invention, the flow control device may further include, in any combination, any one or more of the following preferred forms.

In one preferred form, the retaining element is solid and is one of an O-ring, a snap ring, a retaining ring, a spring retention ring, a shaped wire, or a wave spring.

In another preferred form, the retaining element is a stainless steel spiral retaining ring.

In another preferred form, the retaining element permanently secures the cage to the bonnet such that the cage cannot be removed from the bonnet without damaging the cage or the bonnet.

In another preferred form, the trim cartridge assembly includes a control element positioned in and guided by the cage and a valve stem secured to control element and extending through a bore in the bonnet.

In another preferred form, the cage includes an integral valve seat and the control element engages the valve seat in a closed position.

In another preferred form, the bonnet includes a bevel configured to compress the retaining element during assembly In accordance with another exemplary aspect of the present invention, a unitary trim cartridge assembly for a flow control device comprises a cage, a bonnet coupled to the cage, and a retaining element disposed between the cage and the bonnet. The cage includes an exterior groove formed on an exterior surface of the cage. The bonnet includes an overlapping portion and an interior groove formed on an interior surface of the bonnet and on the overlapping portion. The retaining ring extends into the interior groove of the bonnet and the exterior groove of the cage. A height of the interior groove of the bonnet and/or a height of the exterior groove of the cage is greater than a height of the retaining element to allow the cage to move longitudinally within the bonnet with the bonnet and cage assembled.

In further accordance with any one or more of the foregoing exemplary aspects of the present invention, the trim cartridge assembly may further include, in any combination, any one or more of the following preferred forms.

In one preferred form, the retaining element permanently secures the cage to the bonnet such that the cage and the bonnet cannot be separated without damaging the cage or the bonnet and is one of an O-ring, a snap ring, a retaining ring, a spring retention ring, a shaped wire, or a wave spring.

In another preferred form, the retaining element is a stainless steel spiral retaining ring.

In another preferred form, the trim cartridge assembly comprises a control element positioned in and guided by the cage and a valve stem secured to the control element and extending through a bore in the bonnet.

In another preferred form, the cage includes an integral valve seat that engages the control element in a closed position.

In another preferred form, the bonnet includes a bevel configured to compress the retaining element during assembly.

In accordance with another exemplary aspect of the present invention, a method of assembling a flow control device comprises the steps of: assembling a unitary trim cartridge assembly by installing a retaining member into an external groove of a cage and inserting the cage into an overlapping portion of a bonnet until the retaining member extends into an interior groove formed in the overlapping portion of the bonnet, wherein a height of the interior groove in the bonnet and/or a height of the external groove of the cage is greater than a height of the retaining element to allow the cage to move longitudinally within the bonnet with the bonnet and cage assembled; inserting the trim cartridge assembly into a valve body; and securing the trim cartridge assembly to the valve body.

In further accordance with any one or more of the foregoing exemplary aspects of the present invention, the method of assembling a flow control device may further include, in any combination, any one or more of the following preferred forms.

In one preferred form, the overlapping portion of the bonnet includes a bevel that engages and compresses the retaining member when the cage is inserted into the bonnet.

In another preferred form, the method comprises the step of performing at least one of a leak test and a flow test on the trim cartridge assembly before inserting the trim cartridge assembly into the valve body.

In another preferred form, the retaining element is one of an O-ring, a snap ring, a retaining ring, a spring retention ring, a shaped wire, or a wave spring.

In another preferred form, the retaining element is a stainless steel spiral retaining ring.

In another preferred form, the retaining element permanently secures the cage to the bonnet such that the cage and the bonnet cannot be separated without damaging the cage or the bonnet.

In another preferred form, assembling the trim cartridge assembly includes the steps of: inserting a control element into the cage before the cage is inserted into the bonnet; and inserting a valve stem through a bore in the bonnet and securing the valve stem to the control element.

DETAILED DESCRIPTION

Figure 1:
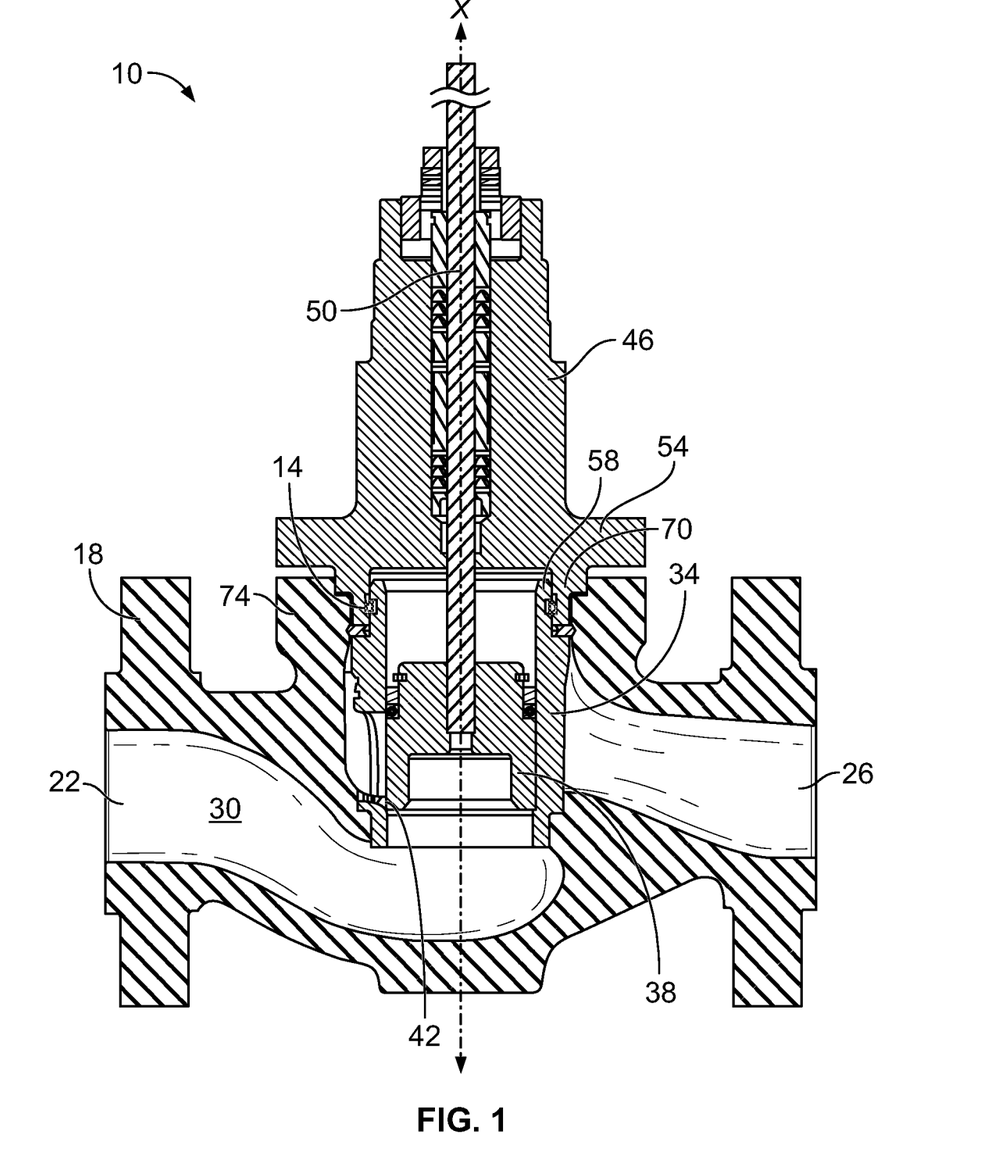
FIG. 1 includes an example flow control device assembled in accordance with the teachings of the present disclosure.

In FIG. 1, a flow control device 10 is illustrated and assembled with a first exemplary retaining ring 14 in accordance with the teachings of the present disclosure. The flow control device 10 is a globe valve and includes a valve body 18 having an inlet 26, an outlet 22, and a flow path 30 connecting the inlet 26 and the outlet 22. A cage 34 is disposed in the flow path 30 and helps guide a control element 38 between an open position, in which the control element 38 is spaced away from a valve seat 42, and a closed position, in which the control element 38 engages the valve seat 42, as shown in FIG. 1. A bonnet 46 connects the valve body 18 to an actuator (not shown) and may help guide a valve stem 50 connected to the control element 38. The lower portion 54 of the bonnet 46, which is a bolted flange, is coupled to the valve body 18 with studs and nuts. The lower portion 54 of the bonnet 46 overlaps with an upper end 58 of the cage 34 (according to the orientation illustrated in FIG. 1) so that the bonnet 46 and cage 34 are aligned relative to a longitudinal axis X. The first exemplary retaining ring 14 is disposed between the cage 34 and the bonnet 46 and includes an interior cavity 62, as shown in more detail in FIGS. 2 and 3.

Figure 2:
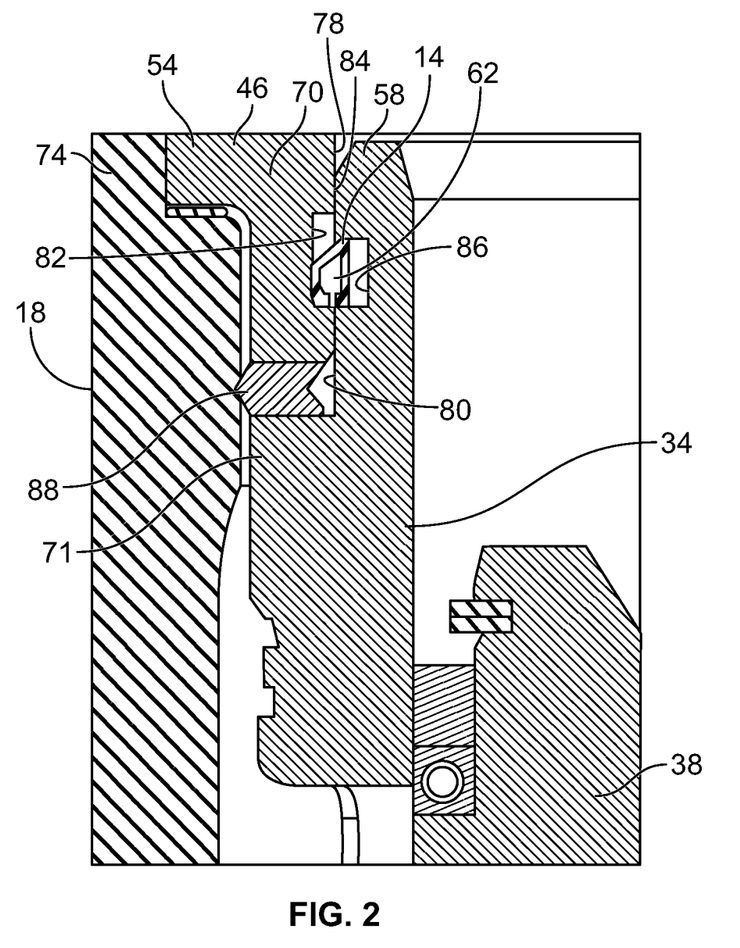
FIG. 2 is a magnified, partial view of a bonnet, cage, and a first exemplary retaining ring of the flow control device of FIG. 1.
Figure 3:
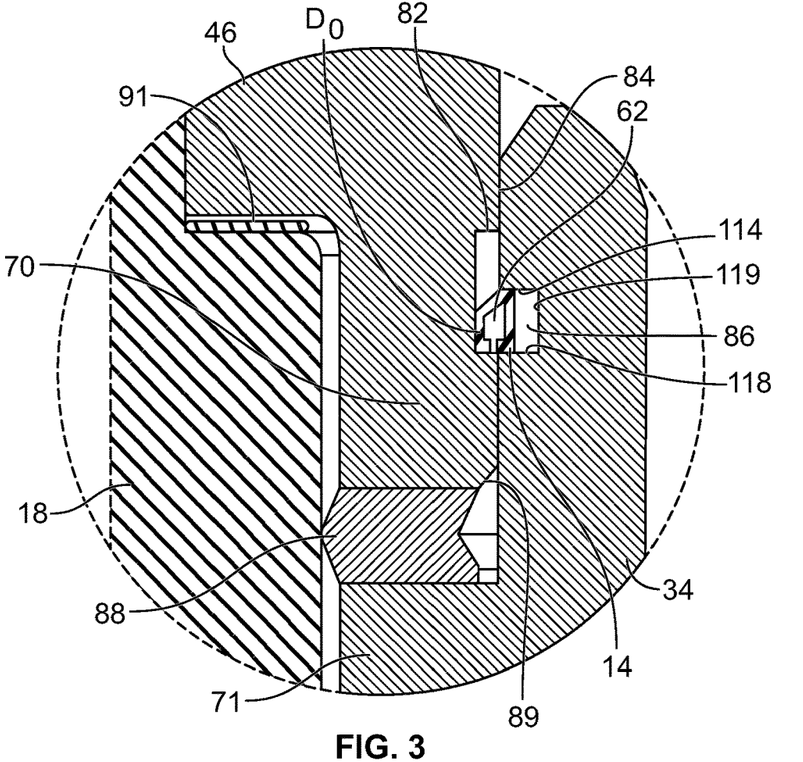
FIG. 3 is a magnified, partial view of the bonnet, cage, and retaining ring of FIG. 2.

Turning to FIGS. 2 and 3, the retaining ring 14 and the upper end 58 of the cage 34 and an overlapping portion 70 of the bonnet 46, respectively, are illustrated in more detail. The overlapping portion 70 of the bonnet 46 is a stepped, annular projection extending from the lower portion 54 of the bonnet 46. The overlapping portion 70 mates with a corresponding stepped portion 74 of the valve body 18 and surrounds the recessed upper end 58 of the cage 34. The bonnet 46 overlaps with the cage 34 such that an interior surface 78 of the bonnet 46 engages an exterior surface 80 of the upper end 58 of the cage 34 at a mating interface 84. A gap is formed in the mating interface 84 where an interior groove 82 is formed in the interior surface 78 of the bonnet 46 and an exterior groove 86 is formed in the exterior surface 80 of the cage 34. When the cage 34 is coupled to the bonnet 46, the exterior groove 86 of the cage 34 is adjacent to the interior groove 82 of the bonnet 46 and the retaining ring 14 is disposed between, and extends into, the adjacent interior and exterior grooves 82, 86.

Additionally, a gasket or seal 88 is disposed between the bonnet 46, the cage 34, and the valve body 18. Specifically, the seal 88 is clamped between the overlapping portion 70 of the bonnet 46 and a stepped portion 71 of the cage 34. In this configuration, the seal 88 may sealingly engage the cage 34 and the bonnet 46 regardless of the relative position between the cage 34 and the bonnet 46. The seal 88 is disposed below (in the orientation of FIGS. 1-3) and radially outward relative to the retaining ring 14. In the illustrated example, the seal 88 is a spiral-wound gasket. However, in other examples, the seal 88 may be different type of seal. Further, a seal 91 is positioned between a shoulder of the overlapping portion 70 of the bonnet 46 and a surface of the stepped portion 74 of the valve body 18. While the seal 91 is shown as a shim gasket or a bonnet gasket, other types of seals may be used.

The retaining ring 14 of the present disclosure is configured to assemble with existing and fixed envelope dimensions of the cage 34 and bonnet 46. In particular, the overlapping portion 70 of the bonnet 46 includes a bevel 89 that has a fixed dimension to ensure proper sealing between the seal 88 and the cage 34. If the bevel 89 were larger to better receive a retaining ring, the sealing area of the seal 88 would be compromised and may cause leaks in the valve assembly. The retaining ring 14 facilitates assembly of existing valve components by including a lead-in chamfered edge 110. During assembly, the chamfered edge 110 of the retaining ring 14 is aligned with the bevel 89 formed in the annular portion of the bonnet 46.

As shown in FIGS. 2-5, the retaining ring 14 is a semi-circular component that includes a gap 90 to allow the retaining ring 14 to compress and expand to fit into the interior and exterior grooves 82, 86 of the bonnet 46 and cage 34 during assembly of the flow control device 10. The retaining ring 14 includes an interior side 94, an exterior side 98, and first and second parallel sides 102, 106 that connect to, and extend between, the interior and exterior sides 94, 98. A portion of the exterior side 98 of the retaining ring 14 is angled to create the chamfered edge 110. An outer diameter $D_O$ (i.e., the diameter of the retaining ring 14 in its expanded position shown in FIG. 4) of the retaining ring 14 at least partly decreases in an axial direction (i.e., upwards in the orientation of FIG. 5) to meet the first parallel side 102 to form the chamfered edge 110. The chamfered edge 110 of the exterior side 98 of the retaining ring 14 provides a chamfered lead-in edge to facilitate assembly of the bonnet 46 with the cage 34. To effectively retain the bonnet 46, the outermost diameter $D_O$ of the retaining ring 14 is greater than an inner diameter of the bonnet 46. As such, during assembly, the bonnet 46 engages the chamfered edge 110 of the retaining ring 14 to compress the retaining ring 14 until the retaining ring 14 expands and snaps into the interior groove 82 of the bonnet 46.

Figure 5:
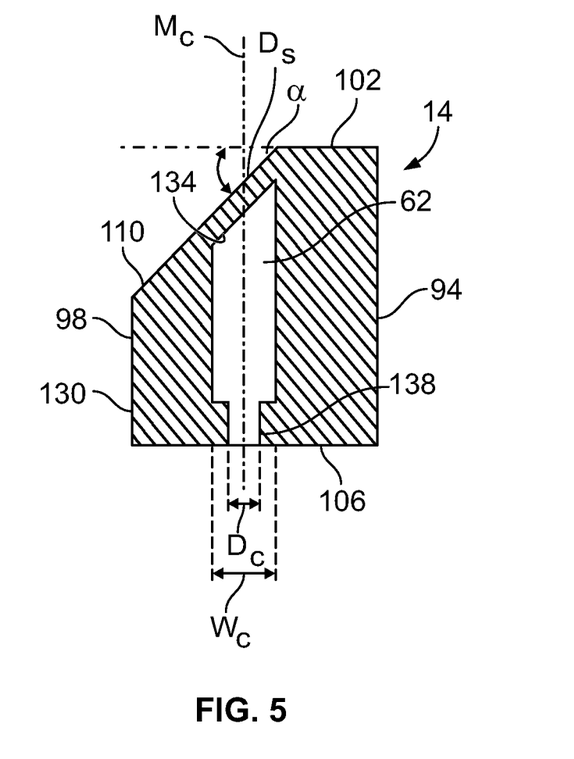
FIG. 5 is a cross-sectional view of the retaining ring of FIG. 1 taken at 5-5 of FIG. 4.

As shown in FIGS. 2 and 3, the chamfered edge 110 is oriented outwardly and faces the bonnet 46. The chamfered edge 110 of the exterior side 98 is partially disposed in both the interior groove 82 of the bonnet 46 and the exterior groove 86 of the cage 34 such that a midpoint $M_C$ of the interior cavity 62 aligns with the mating interface 84 of the cage 34 and the bonnet 46. The midpoint $M_C$ of the interior cavity 62 is aligned with a point on the chamfered edge 110 known as the shear diameter $D_S$ of the retaining ring 14 (as shown in FIG. 5) where the retaining ring 14 breaks due to shearing forces during disassembly. However, in other examples, the chamfered edge 110 may entirely extend into the interior groove 82 of the bonnet 46 such that the midpoint $M_C$ of the interior cavity 62 does not align with the mating interface 84.

FIG. 3 illustrates the first and second parallel sides 102, 106 of the retaining ring 14 engaging with first and second parallel surfaces 114, 118 of the exterior groove 86 of the cage 34. In this configuration, the retaining ring 14 is securely coupled to the exterior groove 86 of the cage 34 by an interference fit. The interior side 94 of the retaining ring 14, however, is spaced from an interior surface 119 of the exterior groove 86 of the cage 34 to permit radial movement of the retaining ring 14 relative to the cage 34. Specifically, the space between the interior side 94 of the retaining ring 14 and the interior surface 119 of the exterior groove 86 provides ample space for the retaining ring 14 to extend further into the exterior groove 86 when the retaining ring 14 is compressed during assembly of the bonnet 46 to the cage 34. In other examples, one of the first and second parallel sides 102, 106 of the retaining ring 14 may be spaced away from the first and second parallel surfaces 114, 118 of the exterior groove 86 to provide clearance between the retaining ring 14 and the cage 34.

Figure 4:
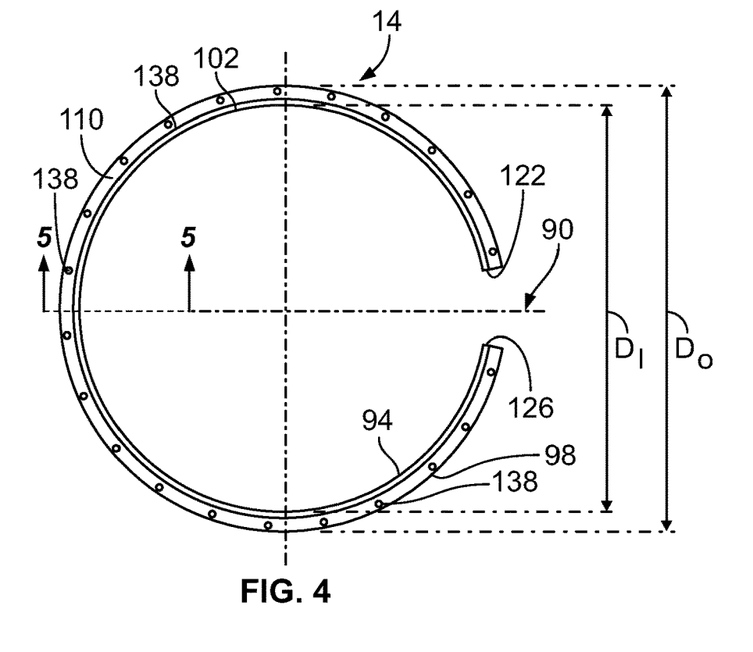
FIG. 4 is a top view of the retaining ring of FIG. 1.

As illustrated in FIG. 4, the retaining ring 14 includes the outer diameter $D_O$, an inner diameter $D_I$, and a gap 90 between first and second ends 122, 126 of the retaining ring 14. To retain the bonnet 46 to the cage 34, the outer diameter $D_O$ of a straight portion 130 of the exterior side 98 of the retaining ring 14 is greater than an outer diameter of the cage 34 and an inner diameter of the bonnet 46. The inner diameter $D_I$ of the retaining ring 14 is less than the outer diameter of the cage 34 such that the retaining ring 14 securely couples to the exterior groove 86 of the cage 34 by a snap fit connection. As previously mentioned, the gap 90 of the retaining ring 14 permits the retaining ring 14 to compress and expand, thereby moving the first and second ends 122, 126 relative to each other so that the retaining ring 14 can couple to the cage 34 and retain the bonnet 46 to the cage 34. The retaining ring 14 may be, for example, a snap-ring that snaps into the interior and exterior grooves 82, 86 of the bonnet 46 and the cage 34 to secure the bonnet 46 to the cage 34. In some examples, the retaining ring 14 may be a single or multiple would ring, stamped ring, beveled ring, and may include additional features to facilitate gripping with snap ring pliers. The retaining ring 14 is made of ferrous or non-ferrous metals. For example, the retaining ring 14 may be a 300 series stainless steel.

Turning now to FIG. 5, a cross-pentagonal cross-sectional shape of the retaining ring 14 is defined by the exterior side 98 having the straight portion 130 and the chamfered edge 110, the interior side 94, which is parallel to the straight portion 130 of the exterior side 98, and first and second parallel sides 102, 106 that extend between the interior and exteriors sides 94, 98. The chamfered edge 110 of the exterior side 98 extends from the outermost diameter $D_O$ of the retaining ring 14 (i.e., the straight portion 130) to the first parallel side 102. The chamfered edge 110 is sloped at an angle α in a range of approximately 30 degrees to approximately 60 degrees, and preferably 45 degrees, relative to the first parallel side 102.

The cross-section of the retaining ring 14 of FIG. 5 also illustrates the interior cavity 62, which is disposed between the interior and exterior sides 94, 98 of the retaining ring 14 and has an angled surface 134 that is substantially parallel to the chamfered edge 110 of the exterior side 98. Unlike the cross-sectional shape of the retaining ring 14, the interior cavity 62 has a trapezoidal cross-sectional shape. The midpoint $M_C$ of the angled surface 134 of the interior cavity 62 is arranged to align with the mating interface 84 when the retaining ring 14 is disposed between the cage 34 and the bonnet 46. This midpoint $M_C$ aligns with the shear diameter $D_S$ of the retaining ring 14, which is the point at which the retaining ring 14 shears (i.e., breaks upon opposing shear forces) when the bonnet 46 is decoupled from the cage 34. For example, when the bonnet 46 is pulled upward (in the orientation of FIG. 1) and away from the cage 34, opposing shear forces act upon the retaining ring 14, causing the retaining ring 14 to break at the shear diameter $D_S$. Compared to solid retaining rings, the hollow retaining ring 14 of the present disclosure requires less shear force to break and therefore facilitates disassembly of the flow control device 10 of FIG. 1.

As described further below, the retaining ring may be manufactured using additive manufacturing (AM) techniques. To facilitate the AM process, a blind hole or channel 138 is formed in the retaining ring 14 and extends from the interior cavity 62 and through at least one of the sides 94, 98, 102, 106 of the retaining ring 14. In the illustrated example, the blind hole 138 connects the interior cavity 62 with the second parallel side 106. The blind hole 138 has a diameter $D_C$ that is smaller than a width $W_C$ of the interior cavity 62, and is formed to allow debris and dust created during manufacturing to fall out of the interior cavity 62 of the retaining ring 14. In this example, the retaining ring 14 has a plurality of blind holes 138 spaced around the circumference of the retaining ring 14.

In the illustrated example, the chamfered edge 110 of the retaining ring 14 and the angled surface 134 of the interior cavity 62 are oriented outward facing the bonnet 46 so that a portion of the bonnet 46 slides against and engages the chamfered edge 110 of the retaining ring 14 during assembly. However, in another example, the chamfered edge 110 of the retaining ring 14 may be oriented inward (i.e., extending to the second parallel side 106), or the interior side 94 of the retaining ring 14 may have a chamfered edge, depending on the assembly and orientation of the bonnet 46 and the cage 34. Additionally, in another example, the interior cavity 62 may be shaped differently and may be pentagonal to match the cross-sectional shape of the retaining ring 14, or the interior cavity 62 may be completely different such as round, triangular, or otherwise polygonal. Further, the interior cavity 62 may vary in structure throughout the circumference of the retaining ring 14. For example, the interior cavity 62 may include lattice elements to provide interior structure to the interior cavity 62, or the interior cavity 62 may be larger in some areas of the retaining ring 14 and smaller in other areas. In yet another example, the retaining ring 14 may be manufactured without an interior cavity 62 or without a lead-in chamfered edge 110.

Figure 6:
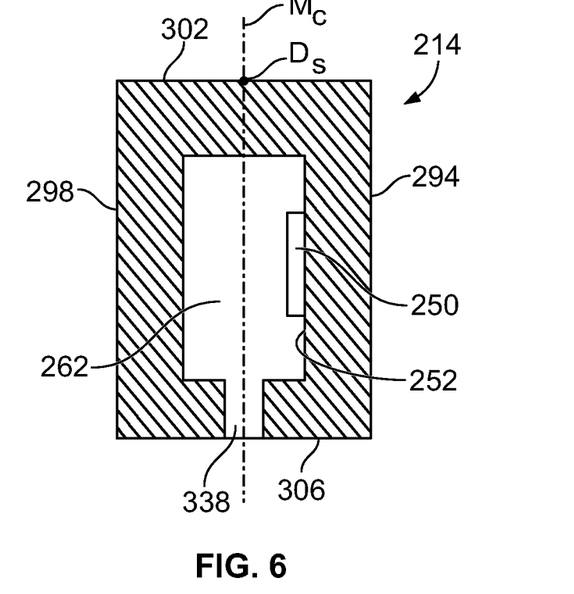
FIG. 6 is a cross-sectional view of a second exemplary retaining ring assembled in accordance with the teachings of the present disclosure.

For example, FIG. 6 illustrates a second exemplary retaining ring 214 that may be used to retain the cage 34 and bonnet 46 of the flow control device 10 of FIG. 1. The retaining ring 214 of FIG. 6 is similar to the retaining ring 14 of FIGS. 1-5 described above, with similar reference numerals (increased by 200) used for similar components but has a different cross-sectional shape and interior cavity 262. Like the first exemplary retaining ring 14, the second exemplary retaining ring 214 includes an interior cavity 262 with a decreased shear area (compared to solid retaining rings). As such, a reduced shear force is required to break the retaining ring 214 to disassemble the cage 34 from the bonnet 46. The second exemplary retaining ring 214 also differs in the cross-sectional shape of the interior cavity 262. In this example, the interior cavity 262 is rectangular and matches the rectangular cross-sectional shape of the retaining ring 214. In this example, the retaining ring 214 does not have a lead-in chamfered edge but is flexible to facilitate assembly.

The retaining ring 214 is illustrated with a sensor 250, e.g., ultrasonic transducer, laser displacement sensor, vibration sensor, etc., disposed in the interior cavity 262. The sensor 250 may be embedded or installed in or on an interior wall 252 (e.g., in between interior and exterior sides 294, 298 of the retaining ring 214) of the interior cavity 262. Specifically, in the illustrated example, the sensor 250 is placed adjacent to the interior wall 252 of the interior cavity 262 and may be attached to the retaining ring 214 during manufacture. The sensor 250 may measure process conditions, component wear, leaks, or may take other diagnostics of the flow control device 10. The sensor 250 may be coupled to a digital valve controller to automate monitoring of the flow control device 10. In one example, the retaining ring 214 may include a plurality of sensors 250 spaced along the circumference of the retaining ring 214.

Figure 7:
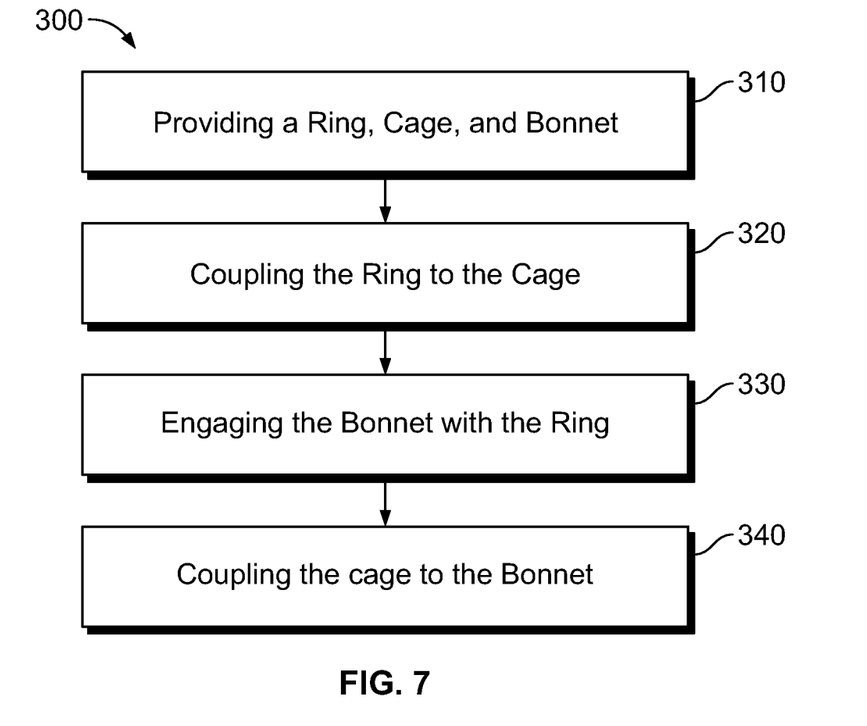
FIG. 7 is a schematic diagram of a method of assembling a bonnet, cage, and retaining ring in accordance with the teachings of the present disclosure.

An exemplary method 300 of retaining the bonnet 46 to the cage 34 is depicted in the schematic diagram of FIG. 7 and is described with reference to the first exemplary retaining ring 14 of FIGS. 1-5. In a first step 310, the retaining ring 14, cage 34, and bonnet 46 of the flow control device 10 is provided. However, in another exemplary method, the retaining ring 14 may be used to retain different valve components. To assemble the bonnet 46 of the flow control device 10, and in particular, to retain the bonnet 46 to the cage 34, the retaining ring 14 is first securely coupled to the exterior groove 86 of the cage 34 in step 320. In step 330, the overlapping portion 70 of the lower portion 54 of the bonnet 46 engages the retaining ring 14 to compress the retaining ring 14 radially inward and further into the exterior groove 86 of the cage 34. When assembling the first exemplary retaining ring 14 of this particular example, the overlapping portion 70 slides against the chamfered edge 110 to facilitate assembly of the bonnet 46 to the valve body 18. Once the interior groove 82 of the bonnet 46 aligns with the exterior groove 86 of the cage 34, the retaining ring 14 expands or snaps into the interior groove 82 of the bonnet 46, as shown in FIGS. 1-3, to couple the cage 34 to the bonnet 46 in step 340.

Figure 8:
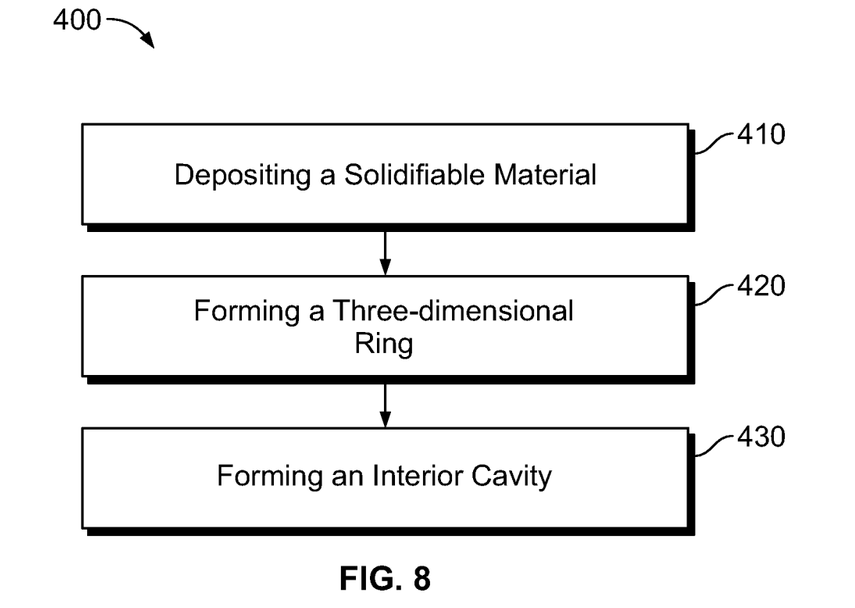
FIG. 8 is a schematic diagram of a method of manufacturing a retaining ring in accordance with the teachings of the present disclosure.

Turning now to FIG. 8, an exemplary method 400 of manufacturing a retaining ring 14, 214 is depicted in the schematic diagram and is described with reference to the first exemplary retaining ring 14 of FIGS. 1-5. The method 400 includes a first step 410 of depositing a solidifiable material on a working surface. As a result of depositing consecutive layers of the solidifiable material, a three-dimensional retaining ring 14 is formed in step 320 in which the retaining ring 14 includes interior and exterior sides 94, 98 and first and second parallel sides 102, 106. In step 430, an interior cavity 62 of the retaining ring 14 is formed. In one example, the interior cavity 62 is formed simultaneously with the formation of the three-dimensional retaining ring 14. However, in other examples, the interior cavity 62 may be formed after the body of the retaining ring 14 is formed. The step 430 of forming the interior cavity 62 includes depositing a solidifiable material in consecutive layers to form an interior cavity 62 surrounded by the sides 94, 98, 102, 106 of the retaining ring 14. The step 430 includes forming an angled surface 134 of the interior cavity 62 that is substantially parallel with the chamfered edge 110 of the retaining ring 14.

Finally, the exterior side 98 of the retaining ring 14 is formed with a chamfered edge 110 such that the outer diameter $D_O$ of the retaining ring 14 decreases in an axial direction to at least one of the first and second parallel sides 102, 106. In one example, the chamfered edge 110 of the retaining ring 14 is formed simultaneously with step 420. However, in other examples, the chamfered edge 110 may be formed after the body of the retaining ring 14 is formed in step 420.

The method 400 also includes forming a plurality of blind holes or channels 138 that connect the interior cavity 62 with the second parallel side 106 of the retaining ring 14. The blind holes or channels 138 may be formed simultaneously with the first and second steps 410, 420 of the method 400, or the blind holes or channels 138 may be formed after the first and second steps 410, 420. As previously mentioned, the blind holes or channels 138 are formed to allow debris and dust created during the additive manufacturing process to fall out of the interior cavity 62 of the retaining ring 14. In this example, the retaining ring 14 has a plurality of blind holes or channels 138 spaced around the circumference of the retaining ring 14.

The retaining ring 14 of the present disclosure may be manufactured with additive manufacturing (AM) techniques, investment casting, wire electrical discharge machining, or a combination of techniques. However, additive manufacturing may allow for greater precision of the interior cavities 62, 262 of the disclosed retaining rings 14, 214 to create smaller shear areas to facilitate breaking.

More specifically, to form the retaining ring 14, 214 of the present disclosure, the steps of method 400 of FIG. 8 utilizes an AM technique or process that builds three-dimensional objects by adding successive layers of material on a receiving surface or material. The AM technique may be performed by any suitable machine or combination of machines. The AM technique may typically involve or use a computer, three-dimensional modeling software (e.g., Computer Aided Design, or CAD, software), machine equipment, and layering material. Once a CAD model is produced, the machine equipment may read in data from the CAD file and layer or add successive layers of liquid, powder, sheet material (for example) in a layer-upon-layer fashion to fabricate a three-dimensional object. The AM technique may include any of several techniques or processes, such as, for example, a stereolithography ("SLA") process, digital light processing ("DLP"), a fused deposition modeling ("FDM") process, multi-jet modeling ("MJM") process, a selective laser sintering ("SLS") process, a selective laser melting ("SLM") process, powder bed fusion process, an electronic beam melting ("EBM") process, and an arc welding AM process. In some examples, the AM process may include a directed energy laser deposition process. Such a directed energy laser deposition process may be performed by a multi-axis computer-numerically-controlled ("CNC") lathe with directed energy laser deposition capabilities. Other manufacturing techniques may be utilized to create a valve cage according to the present disclosure and are not limited to the listed techniques herein.

The retaining rings 14, 214 and the methods 400, 300 of manufacture and assembly disclosed herein may provide a solution to problems associated with assembly and disassembly of bonnet and cage assemblies where the envelope dimensions are fixed. The retaining rings 14, 214 disclosed herein may be customized during manufacturing using AM techniques to provide a retaining ring 14, 214 with a reduced shear area by forming an interior cavity 62, 262, and therefore reduced material, as compared to traditional retaining rings. Traditionally, when working with fixed envelope dimensions, a retaining ring may be made with a reduced ring height or an increase ring gap to reduce shear area of the ring. However, traditional retaining rings like these would cause undesirable clearance and misalignment between the valve components. Thus, the retaining rings 14, 214 of the present disclosure do not compromise height or ring gap to reduce shear area, and therefore maintain alignment and stability between the valve components. In fact, the retaining rings 14, 214 are manufactured according to fixed envelope dimensions to closely fit into the interior and exterior grooves 82, 86 of the bonnet 46 and the cage 34 of the flow control device 10.

The retaining ring 14 of the present disclosure adapts to existing and fixed envelope dimensions of the cage 34 and the bonnet 46 by including a lead-in chamfered edge 110. Typically, one or more valve components may have an angled surface that assists with assembly when mating with a different valve component. However, when a lead-in angled surface is either impractical or impossible for a valve component such as, for example a bonnet, retaining the bonnet to the cage using a retaining ring may be difficult. To address this issue, the lead-in chamfered edge 110 of the first exemplary retaining ring 14 assists in coupling the bonnet 46 to the cage 34 when the bonnet 46 does not have a traditional lead-in surface, and providing one to the bonnet 46 would be expensive and/or cause sealing issues with the cage 34.

As discussed above, the retaining rings 14, 214 of the present disclosure reduce shear area by forming an interior cavity 62, 262, which may be formed precisely using AM techniques. For example, the angled surface 134 of the interior cavity 62 of the first exemplary retaining ring 14 may be manufactured using, for example, powder bed laser metal sintering, to form the angled surface 134 so that it is parallel with the chamfered edge 110 of the exterior side 98. The angled surface 134 of the interior cavity 62 advantageously follows the chamfered edge 110 to compensate for any misalignment between the retaining ring 14 and the bonnet 46. In this way, the interior cavity 62 ensures that the shear area is identical between small variations in shear diameter (i.e., when there is some misalignment with the mating interface 84 and the midpoint $M_C$ of the interior cavity 62). In other examples, additive manufacturing may permit utilization of sensor technology within the retaining ring 14, 214. As shown in the second exemplary retaining ring 214, a sensor 250 may be disposed within the interior cavity 262 for measuring valve process conditions and diagnostics. The sensor 250 may be placed in the interior cavity 262 or embedded in one of the sides of the retaining ring 214 during manufacture using AM techniques. While not expressly illustrated, the first exemplary retaining ring 14 previously described may also be paired with one or more sensors, e.g., ultrasonic transducer, laser displacement sensor, vibration sensor, etc., to take measurements of process conditions or other diagnostics within the flow control device 10.

While the retaining rings 14, 214 are described in conjunction with a cage 34 and a bonnet 46 of the flow control device 10 of FIG. 1, the retaining rings 14, 214 may be custom manufactured to retain different valve components for use with a different control valve assembly. For example, the retaining ring 14, 214 may be used to retain two valve components where at least one of the valve components is neither a cage nor a bonnet. For example, the retaining ring 14, 214 may be used to retain two completely different valve components.

Figure 9:
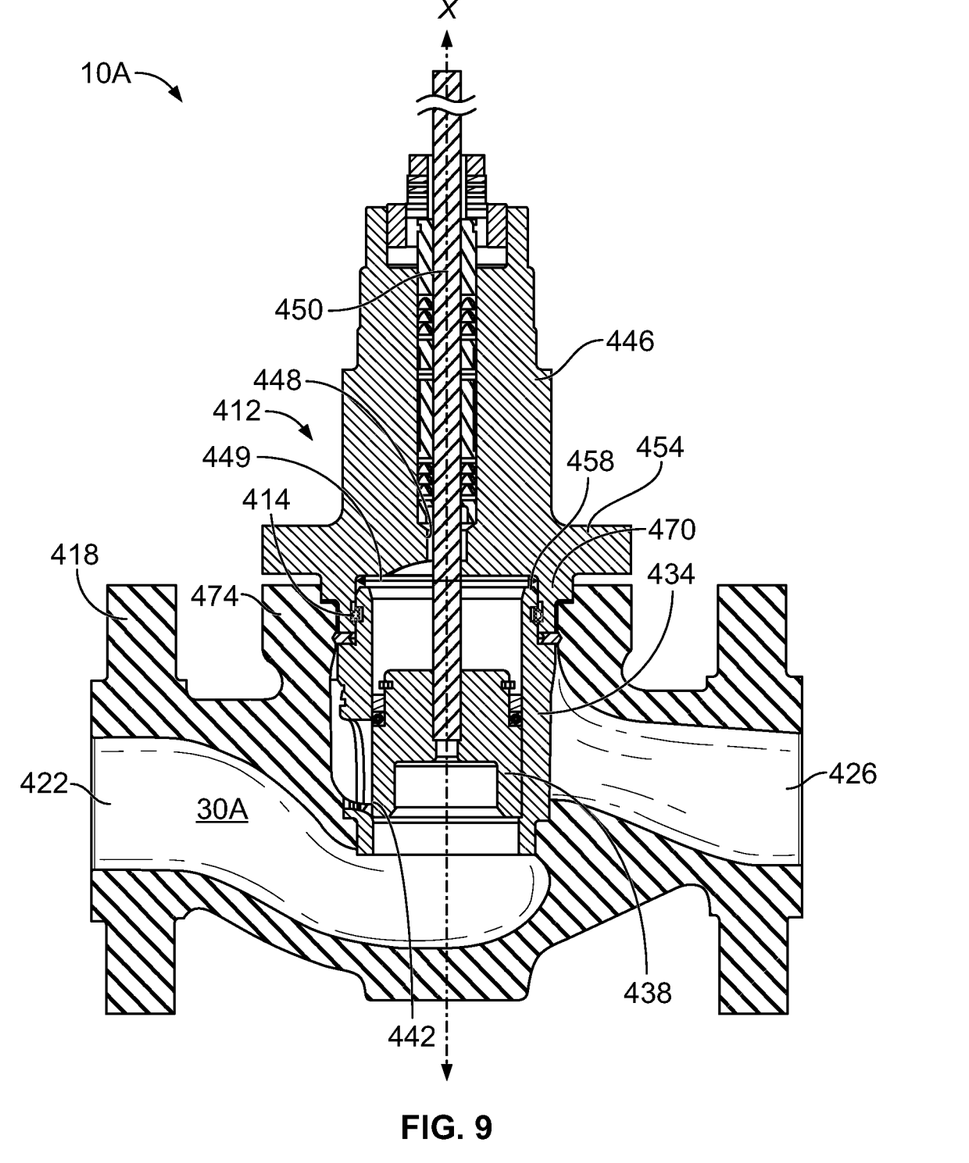
FIG. 9 is another example flow control device assembled in accordance with the teachings of the present disclosure.

Referring to FIG. 9, a second example flow control device 10A is illustrated and includes a valve body 418 and an example trim cartridge assembly 412, with a third exemplary retaining element 414, secured to valve body 418. In this example, trim cartridge assembly 412 is permanently coupled together using a retaining element that allows for linear movement between the cage and bonnet once assembled. This linear movement accommodates both machining tolerances of the components and linear thermal expansion of the parts. In addition, since trim cartridge assembly 412 is permanently coupled together, it is also possible to perform testing on trim cartridge assembly 412, such as leak testing of the seat and seals and flow testing, before it is assembled in valve body 418. This can be useful, particularly since the seat and seals are the common replacement items when repairing a flow control device. Factory performance testing of trim components is not possible with existing trim assembly parts when not fully assembled in a complete flow control device due to the variability of the individual parts and how they are assembled. If a combination of individual parts were performance tested and then disassembled and reassembled in a different body, the parts would not line up the same way they did during the testing. These parts rely on metal to metal sealing, which create a "matched set" when assembled the first time. Small changes to this sealing surfaces due to orientation or assembly of the parts will invalidate any prior testing.

However, the assembled unitary trim cartridge assembly 412 allows an end user to have a factory tested trim cartridge assembly when field repairing flow control devices, either in-line or on a bench. The assembled trim cartridge assembly can be inserted into a test fixture that mimics the mating surfaces of a valve body. Then applying stem loading and test pressure, trim cartridge assembly 412 can be seat-leak tested and plug seal leak tested to the same standards as a complete flow control device. The testing makes a "matched set" between the plug seat, seating surface, seals, and sealing surfaces.

In the example shown, flow control device 10A is a globe valve and valve body 418 has an inlet 426, an outlet 422, and a flow path 30A connecting inlet 426 and outlet 422. Trim cartridge assembly 412 is a unitary assembly that is secured to valve body 418 and generally includes a cage 434, a bonnet 446, and retaining element 414. Trim cartridge assembly 412 can also include a control element 438 and a valve stem 450. Cage 434 is disposed in flow path 30A and helps guide a control element 438 positioned in cage 434 between an open position, in which control element 438 is spaced away from a valve seat 442, and a closed position, in which control element 438 engages valve seat 442, as shown in FIG. 9. Preferably, as shown in FIG. 9, valve seat 442 is an integral part of cage 434, but could also be a separate part that is attached to cage 434. Bonnet 446 connects valve body 418 to an actuator (not shown) and may help guide valve stem 450, which extends through a bore 448 in bonnet 446 and is secured to control element 438, for example, through a threaded connection. The lower portion 454 of bonnet 446, which is a bolted flange, is coupled to valve body 418 with studs and nuts and overlaps with an upper end 458 of cage 434 so that bonnet 446 and cage 434 are aligned relative to a longitudinal axis X. The third exemplary retaining element 414 is disposed between cage 434 and bonnet 446, as shown in more detail in FIGS. 10 and 11 and described in more detail below.

Figure 10:
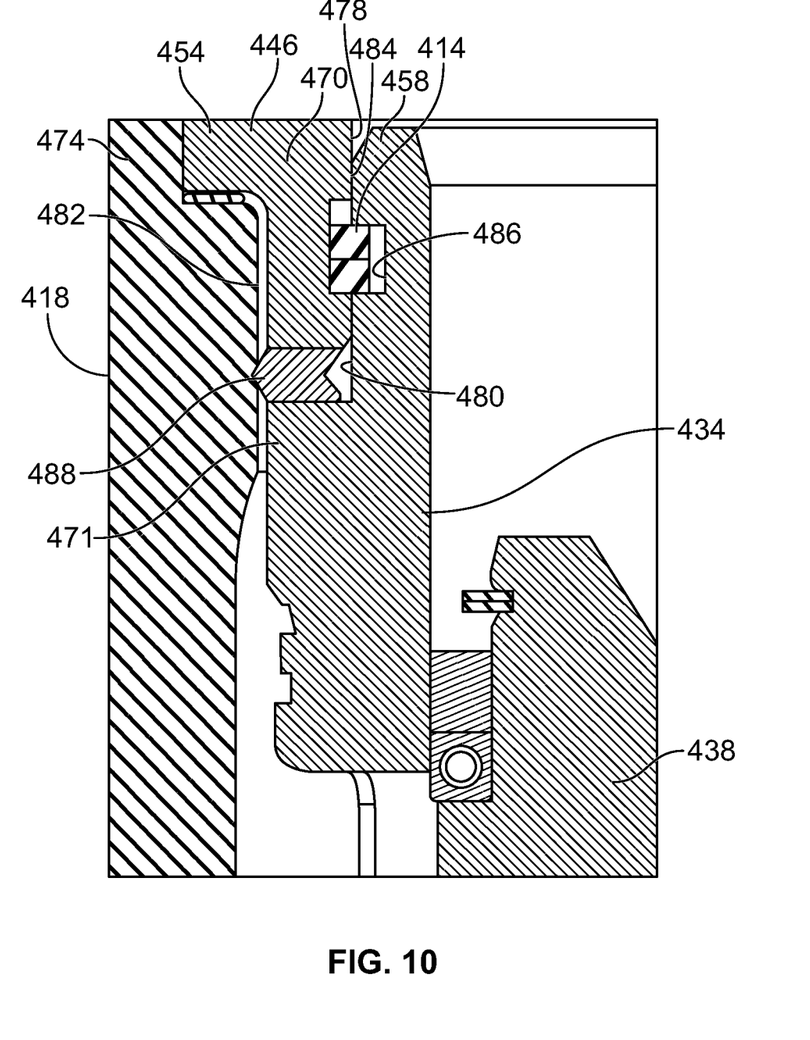
FIG. 10 is a magnified, partial view of a bonnet, cage, and an exemplary retaining element of the flow control device of FIG. 9.
Figure 11:
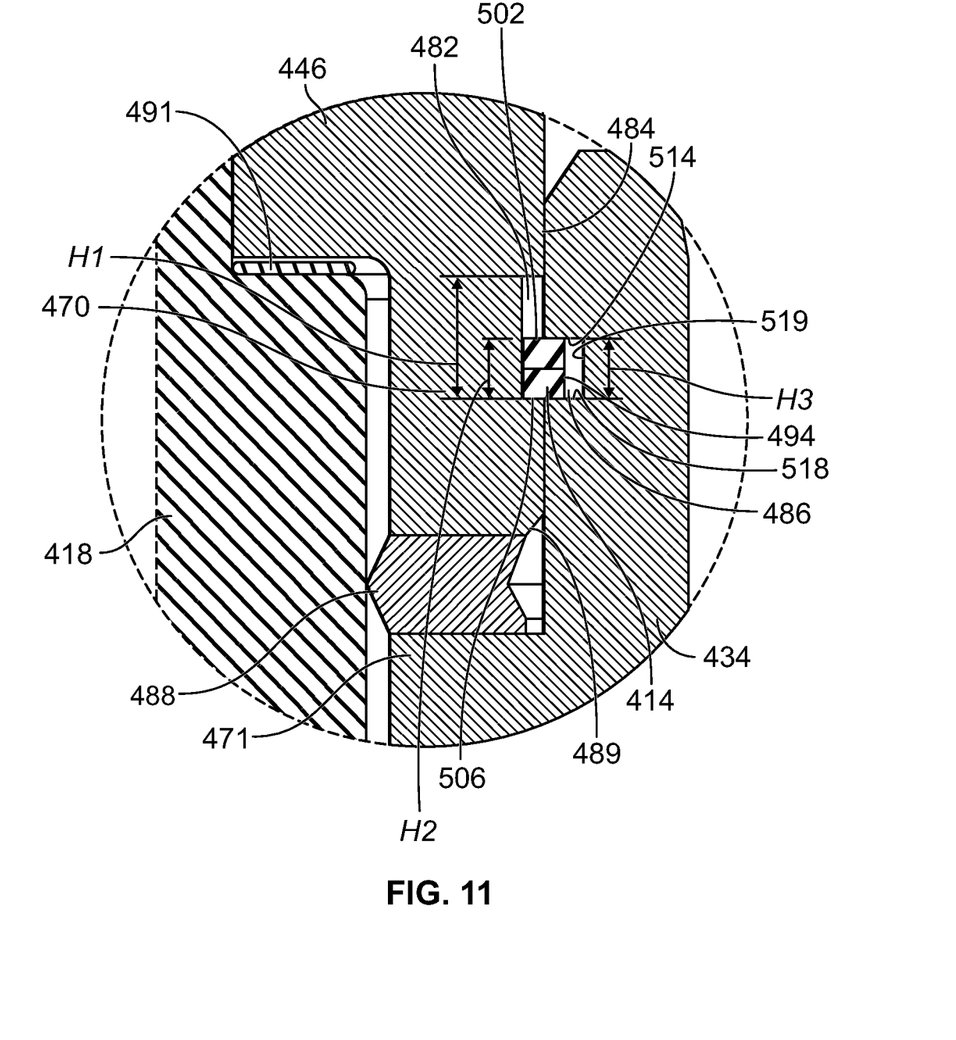
FIG. 11 is a magnified, partial view of the bonnet, cage, and retaining element of FIG. 10.

Turning to FIGS. 10 and 11, retaining element 414 and the upper end 458 of cage 434 and an overlapping portion 470 of bonnet 446, respectively, are illustrated in more detail. Overlapping portion 470 of bonnet 446 is a stepped, annular projection extending from lower portion 454 of bonnet 446, mates with a corresponding stepped portion 474 of valve body 418, and surrounds recessed upper end 458 of cage 434. Bonnet 446 overlaps with cage 434 such that an interior surface 478 of bonnet 446 engages an exterior surface 480 of upper end 458 of cage 434 at a mating interface 484. A gap is formed in mating interface 484 where an interior groove 482 is formed on interior surface 478 and on overlapping portion 470 of bonnet 446 and an exterior groove 486 is formed in exterior surface 480 of cage 434. When bonnet 446 is coupled to cage 434, exterior groove 486 of cage 434 is adjacent to interior groove 482 of bonnet 446 and retaining element 414 is disposed between, and extends into, interior groove 482 and exterior groove 486.

Additionally, a gasket or seal 488 can be disposed between bonnet 446, cage 434, and valve body 418. Specifically, seal 488 can be clamped between overlapping portion 470 of bonnet 446 and a stepped portion 471 of cage 434. In this configuration, seal 488 may sealingly engage cage 434 and bonnet 446 regardless of the relative position between cage 434 and bonnet 446. Seal 488 can also be disposed below (in the orientation of FIGS. 9-11) and radially outward relative to retaining element 414. In the illustrated example, seal 488 is a spiral-wound gasket. However, in other examples, seal 488 may be different type of seal. Furthermore, a seal 491 can also be positioned between a shoulder of overlapping portion 470 of bonnet 446 and a surface of stepped portion 474 of valve body 418. While seal 491 is shown as a shim gasket or a bonnet gasket, other types of seals may be used.

Retaining element 414 is configured to assemble with existing and fixed envelope dimensions of cage 434 and bonnet 446. In particular, overlapping portion 470 of bonnet 446 includes a bevel 489 that has a fixed dimension to ensure proper sealing between seal 488 and cage 434. If bevel 489 were larger to better receive a retaining ring, the sealing area of seal 488 would be compromised and may cause leaks in the valve assembly.

Retaining element 414 is preferably solid and can be one of an O-ring, a snap ring, a retaining ring, a spring retention ring, a shaped wire, or a wave spring, which permanently secures cage 434 to bonnet 446, such that cage 434 cannot be removed from bonnet 446, once assembled, without damaging cage 434 or bonnet 446. In the example shown, retaining element 414 is a stainless steel spiral retaining ring, such as such as those made by Spirolox. To effectively retain bonnet 446, an outermost diameter of retaining element 414 is greater than an inner diameter 449 of bonnet 446. As such, during assembly, bevel 489 of bonnet 446 engages retaining element 414 to compress retaining element 414 until retaining element 414 expands and snaps into interior groove 482 of bonnet 446 to couple bonnet 446 to cage 434.

As shown in FIGS. 10 and 11, a height H1 of interior groove 482 in bonnet 446 is greater than a height H2 of retaining element 414 to allow cage 434 to move longitudinally within bonnet 446 along longitudinal axis X with bonnet 446 and cage 434 assembled. In this configuration, first and second parallel sides 502, 506 of the retaining element 414 engage with first and second parallel surfaces 514, 518 of exterior groove 486 of cage 434, such that retaining element 414 is securely coupled to exterior groove 486 of cage 434 by an interference fit. An interior side 494 of retaining element 414 is spaced from an interior surface 519 of exterior groove 486 of cage 434 to permit radial movement of retaining element 414 relative to cage 434. Specifically, the space between interior side 494 of retaining element 414 and interior surface 519 of exterior groove 486 provides ample space for retaining element 414 to extend further into exterior groove 486 when retaining element 414 is compressed during assembly of bonnet 446 to cage 434. Alternatively, a height H3 of exterior groove 486 of cage 434 could be greater than height H2 of retaining element 414, or both height H1 of interior groove 482 and height H3 of exterior groove 486 could both be greater than height H2 of retaining element, which would also allow cage 434 to move longitudinally within bonnet 446 along longitudinal axis X with bonnet 446 and cage 434 assembled. In these configurations, one or both of first and second parallel sides 502, 506 of retaining element 414 may be spaced away from first and second parallel surfaces 514, 518 of exterior groove 486 to provide clearance between retaining element 414 and cage 434. The additional groove height of interior groove 482 and/or exterior groove 486 accommodates compression of the parts and seals as trim cartridge assembly 412 is secured to valve body 416, as well as the variance in machining tolerances of both trim cartridge assembly 412 and valve body 418. The additional height of interior groove 482 and/or exterior groove 486 also accounts for changes in height due to thermal expansion. Cage 434 can be a different material than valve body 418 and bonnet 446. When heated, the different thermal expansions of the materials cause the height of cage 434 relative to valve body 418 to change. If cage 434 was not able to extend further into bonnet 446, cage 434 would expand faster than valve body 418, which would cause overstressing of valve body 418 to the bonnet bolting or unloading of the gasket: causing failure of flow control device 10A.

To retain bonnet 446 to cage 434, the outer diameter of the retaining element 414 is greater than an outer diameter of cage 34 and inner diameter 449 of bonnet 446. In addition, the inner diameter of retaining element 414 is less than the outer diameter of cage 434, such that retaining element 414 extends into both interior groove 482 of bonnet 446 and exterior groove 486 of cage 434 to securely couple bonnet 446 to cage 434 by a snap fit connection. Retaining element 414 operates as an ID/OD lock between cage 434 and bonnet 446.

Figure 12:
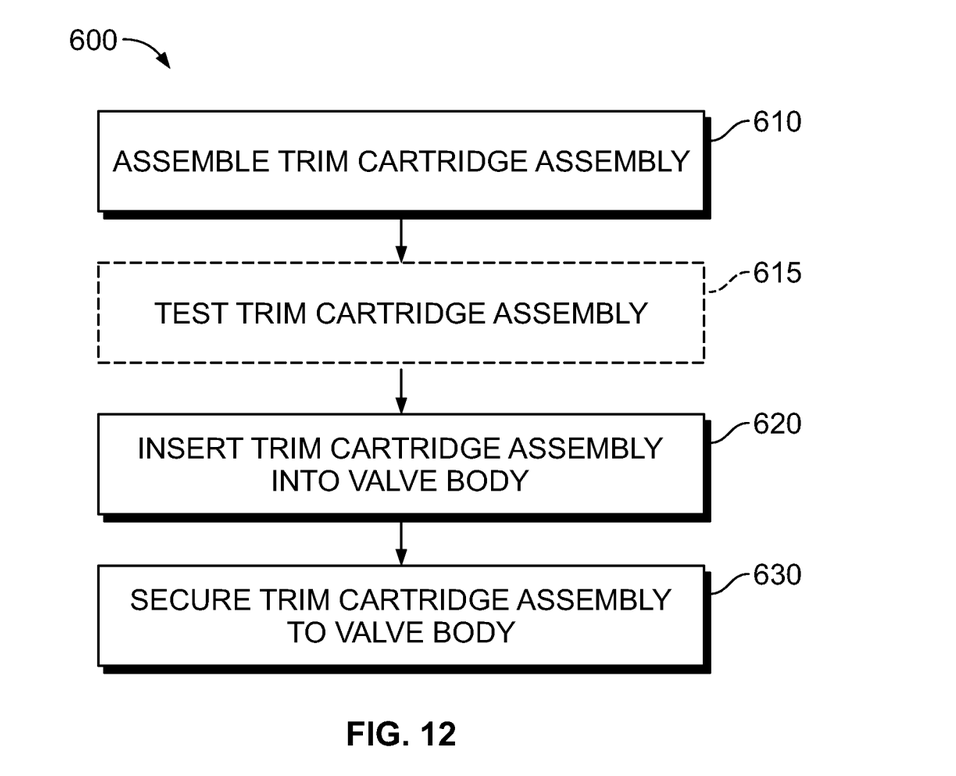
FIG. 12 is a schematic diagram of a method of assembling a flow control device in accordance with the teachings of the present disclosure.

An exemplary method 600 of assembling flow control device 10A is depicted in the schematic diagram of FIG. 12. In a first step 610, the trim unitary trim cartridge assembly 412 is assembled. In this example, trim cartridge assembly 412 is assembled by first installing retaining element 414 into exterior groove 486 of cage 434. As discussed above, retaining element 414 can be an O-ring, a snap ring, a retaining ring, a spring retention ring, a shaped wire, or a wave spring and is preferably a stainless steel spiral retaining ring. In addition, if desired, control element 438 can also be inserted into cage 434 at this time and valve stem 450 can be inserted through bore 448 in bonnet 446 and secured to control element 438. Cage 434 is then inserted into overlapping portion 470 of bonnet 446 until retaining element 414 extends into interior groove 482 in overlapping portion 470 of bonnet 446. Once cage 434 and retaining element 414 have been fully inserted into bonnet 446, retaining element 414 snaps outward into interior groove 482 on bonnet 446. To assist in inserting cage 434 and retaining element 414 into bonnet 446, overlapping portion 470 of bonnet 446 can include bevel 489 that engages and compresses retaining element 414 when cage 434 is inserted into bonnet 446. Preferably, retaining element 414 permanently secures cage 434 to bonnet 446 such that cage 434 and bonnet 446 cannot be separated without damaging cage 434 and/or bonnet 446. As discussed above, height H1 of interior groove 482 and/or height H3 of exterior groove 486 can be greater than height H2 of retaining element 414 so that cage 434 is allowed to move longitudinally within bonnet 446 with bonnet 446 and cage 434 assembled. In step 620, the assembled trim cartridge assembly 412 is inserted into valve body 418. Trim cartridge assembly 412 is then secured to valve body 418, for example by bolts or other threaded members at step 630. If desired, at optional step 615, at least one of a leak test and a flow test can be performed on trim cartridge assembly 412 once trim cartridge assembly 412 has been assembled and before trim cartridge assembly 412 is inserted into valve body 418.

The figures and description provided herein depict and describe a preferred embodiment of a retaining ring for purposes of illustration only. One skilled in the art will readily recognize from the foregoing discussion that alternative embodiments of the components illustrated herein may be employed without departing from the principles described herein. Thus, upon reading this disclosure, those of skill in the art will appreciate still additional alternative structural and functional designs for retaining rings. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the methods and components disclosed herein without departing from the spirit and scope defined in the appended claims.

What is claimed is:

1. A flow control device, comprising:
   a valve body having an inlet, an outlet, and a flow path connecting the inlet and the outlet; and
   a unitary trim cartridge assembly secured to the valve body, the trim cartridge assembly comprising:
      a cage disposed in the flow path and including an exterior groove formed on an exterior surface of the cage;
      a bonnet coupled to the cage and including an overlapping portion and an interior groove formed on an interior surface of the bonnet and on the overlapping portion; and
      a retaining element disposed between the cage and the bonnet and extending into the interior groove of the bonnet and the exterior groove of the cage;
   wherein
      a height of the interior groove in the bonnet and/or a height of the exterior groove of the cage is greater than a height of the retaining element to allow the cage to move longitudinally within the bonnet with the bonnet and cage assembled.

2. The flow control device of claim 1, wherein the retaining element is solid and is one of an O-ring, a snap ring, a retaining ring, a spring retention ring, a shaped wire, or a wave spring.

3. The flow control device of claim 2, wherein the retaining element is a stainless steel spiral retaining ring.

4. The flow control device of claim 1, wherein the retaining element permanently secures the cage to the bonnet such that the cage cannot be removed from the bonnet without damaging the cage or the bonnet.

5. The flow control device of claim 1, wherein the trim cartridge assembly includes a control element positioned in and guided by the cage and a valve stem secured to control element and extending through a bore in the bonnet.

6. The flow control device of claim 5, wherein the cage includes an integral valve seat and the control element engages the valve seat in a closed position.

7. The flow control device of claim 1, wherein the bonnet includes a bevel configured to compress the retaining element during assembly.

8. A unitary trim cartridge assembly for a flow control device, the trim cartridge assembly comprising:
   a cage including an exterior groove formed on an exterior surface of the cage;
   a bonnet coupled to the cage and including an overlapping portion and an interior groove formed on an interior surface of the bonnet and on the overlapping portion; and
   a retaining element disposed between the cage and the bonnet and extending into the interior groove of the bonnet and the exterior groove of the cage; wherein
   a height of the interior groove in the bonnet and/or a height of the exterior groove in the cage is greater than a height of the retaining element to allow the cage to move longitudinally within the bonnet with the bonnet and cage assembled.

9. The trim cartridge assembly of claim 8, wherein the retaining element permanently secures the cage to the bonnet such that the cage and the bonnet cannot be separated without damaging the cage or the bonnet and is one of an O-ring, a snap ring, a retaining ring, a spring retention ring, a shaped wire, or a wave spring.

10. The trim cartridge assembly of claim 9, wherein the retaining element is a stainless steel spiral retaining ring.

11. The trim cartridge assembly of claim 8, comprising a control element positioned in and guided by the cage and a valve stem secured to the control element and extending through a bore in the bonnet.

12. The trim cartridge assembly of claim 11, wherein the cage includes an integral valve seat that engages the control element in a closed position.

13. The trim cartridge assembly of claim 8, wherein the bonnet includes a bevel configured to compress the retaining element during assembly.

14. A method of assembling a flow control device, comprising the steps of:
 assembling a unitary trim cartridge assembly by:
  installing a retaining element into an exterior groove of a cage;
  inserting the cage into an overlapping portion of a bonnet until the retaining element extends into an interior groove formed in the overlapping portion of the bonnet, wherein a height of the interior groove in the bonnet and/or a height of the exterior groove of the cage is greater than a height of the retaining element to allow the cage to move longitudinally within the bonnet with the bonnet and cage assembled;
 inserting the trim cartridge assembly into a valve body; and
 securing the trim cartridge assembly to the valve body.

15. The method of claim 14, wherein the overlapping portion of the bonnet includes a bevel that engages and compresses the retaining element when the cage is inserted into the bonnet.

16. The method of claim 14, comprising the step of performing at least one of a leak test and a flow test on the trim cartridge assembly before inserting the trim cartridge assembly into the valve body.

17. The method of claim 14, wherein the retaining element is one of an O-ring, a snap ring, a retaining ring, a spring retention ring, a shaped wire, or a wave spring.

18. The method of claim 17, wherein the retaining element is a stainless steel spiral retaining ring.

19. The method of claim 14, wherein the retaining element permanently secures the cage to the bonnet such that the cage and the bonnet cannot be separated without damaging the cage or the bonnet.

20. The method of claim 14, wherein assembling the trim cartridge assembly includes the steps of:
 inserting a control element into the cage before the cage is inserted into the bonnet; and
 inserting a valve stem through a bore in the bonnet and securing the valve stem to the control element.

* * * * *

UNITED STATES PATENT AND TRADEMARK OFFICE
CERTIFICATE OF CORRECTION

| | | |
|---|---|---|
| PATENT NO. | : 11,898,652 B2 | Page 1 of 1 |
| APPLICATION NO. | : 17/223067 | |
| DATED | : February 13, 2024 | |
| INVENTOR(S) | : Steven K. Hostetter et al. | |

It is certified that error appears in the above-identified patent and that said Letters Patent is hereby corrected as shown below:

In the Specification

Column 1, Line 10, "2020," should be -- 2020, now U.S. Pat. No. 11,339,891, --.

Column 2, Lines 26-27, "assembly" should be -- assembly. --.

Column 9, Line 45, "increase" should be -- increased --.

Column 12, Line 22, "such as such as" should be -- such as --.

Signed and Sealed this
Twenty-ninth Day of April, 2025

Coke Morgan Stewart
*Acting Director of the United States Patent and Trademark Office*